US011848992B2

(12) United States Patent
Snyder (10) Patent No.: US 11,848,992 B2
(45) Date of Patent: *Dec. 19, 2023

(54) SCALABLE REPLICATION OF OBJECTS POSITIONS IN VIRTUAL SIMULATIONS

(71) Applicant: Improbable Worlds Limited, London (GB)

(72) Inventor: Samuel James Henry Snyder, Cambridge (GB)

(73) Assignee: Improbable Worlds Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/710,845

(22) Filed: Mar. 31, 2022

(65) Prior Publication Data
US 2022/0286523 A1 Sep. 8, 2022

Related U.S. Application Data

(63) Continuation of application No. 17/193,186, filed on Mar. 5, 2021, now Pat. No. 11,316,955.

(51) Int. Cl.
*H04L 67/131* (2022.01)
*G06F 16/2458* (2019.01)
(Continued)

(52) U.S. Cl.
CPC .......... *H04L 67/131* (2022.05); *G06F 16/212* (2019.01); *G06F 16/2477* (2019.01);
(Continued)

(58) Field of Classification Search
None
See application file for complete search history.

(56) References Cited

U.S. PATENT DOCUMENTS

| 8,441,486 | B2 | 5/2013 | Gower |
| 8,933,829 | B2 | 1/2015 | Beier et al. |
| (Continued) | | | |

OTHER PUBLICATIONS

Varghese et al., "SMART: secure mobile augmented reality for tele-assistance", Sep. 7, 2015, IEEE, 2015 Asia Pacific Conference on Multimedia and Broadcasting (pp. 1-7) (Year: 2015).*

(Continued)

*Primary Examiner* — Davoud A Zand
(74) *Attorney, Agent, or Firm* — Banner & Witcoff, Ltd.

(57) ABSTRACT

Methods and systems for providing scalable replication of object positions in virtual simulations are described herein. A computing device may determine a current position of an entity in a virtual simulation. The computing device may determine, based on the current position, a time derivative of the current position of the entity. The computing device may query a dictionary for the time derivative to obtain a particular index identifying a time derivative value that corresponds to the time derivative of the current position of the entity. The dictionary may comprise one or more time derivative value pairs associated with time derivatives of one or more previous positions of the entity. When the time derivative of the current position of the entity is in the dictionary, the computing device may encode the particular index. Further, the computing device may send the particular index to a client device.

20 Claims, 7 Drawing Sheets

(51) Int. Cl.
*G06F 16/21* (2019.01)
*H04L 67/1095* (2022.01)
*A63F 13/358* (2014.01)

(52) U.S. Cl.
CPC ........ *H04L 67/1095* (2013.01); *A63F 13/358* (2014.09); *A63F 2300/534* (2013.01)

(56) References Cited

U.S. PATENT DOCUMENTS

| | | | |
|---|---|---|---|
| 9,942,717 B1* | 4/2018 | Chen | G01S 5/0289 |
| 2006/0022833 A1* | 2/2006 | Ferguson | G08B 21/0288 |
| | | | 340/539.13 |
| 2017/0337813 A1* | 11/2017 | Taylor | G05D 1/0285 |
| 2019/0082233 A1* | 3/2019 | Love | H04N 21/21805 |
| 2020/0145493 A1* | 5/2020 | Wang | H04L 67/34 |
| 2021/0090449 A1* | 3/2021 | Smith | G06V 20/20 |
| 2021/0104014 A1* | 4/2021 | Kolb, V | G06T 5/20 |

OTHER PUBLICATIONS

Aronson, Jesse, "Gamasutra—Features—Dead Reckoning: Latency Hiding for Networked Games", May 12, 2012, http://www.gamasutra.com/view/feature/131638/dead_reckoning_latecy_hiding_for_php.
Anonymous: Dictionary Coder—Wikipedia, The Free Encyclopedia, Nov. 20, 2014, http://en.wikipedia.org/wiki/Dictionary.
May 4, 2022—(WO) International Search Report and Written Opinion—App PCT/GB2022/050401.
Nov. 30, 2022—(GB) Examination Report—App GB2216064.2.

* cited by examiner

SCALABLE REPLICATION OF OBJECTS POSITIONS IN VIRTUAL SIMULATIONS

CROSS-REFERENCE TO RELATED APPLICATION

This application claims the benefit of U.S. application Ser. No. 17/193,186, titled "Scalable Replication of Object Positions In Virtual Simulations," and filed Mar. 5, 2021. The above-referenced application is hereby incorporated by reference in its entirety,

FIELD

Aspects described herein generally relate to computers, networking, hardware, and software. More specifically, some aspects described herein relate to compression, replication, and synchronization of object positions in virtual simulations.

BACKGROUND

Virtual simulations can provide immersive game environments in which players may interact with others. Tracking and synchronization of player positions are important to maintain a consistent view for each player. For example, in a larger-scale video game, each player would like to see other players' positions in order to interact with them. Thus, a game server may try to synchronize all players' positions based on the time and players' inputs by constantly exchanging messages with client devices and sending updates to each client via a communication channel such as the Internet. But due to the bandwidth constraint, only position information of nearby players may be transmitted.

As an example, in a typical video game, a single client may receive up to approximately 25 KB/s of data. This may allow for at most approximately 2,000 transforms (e.g., position and/or rotation updates of a single entity) per second based on a standard transform of approximately 13 bytes, which allows each player to see approximately 67 other players at high fidelity of 30 Hz. There is a need for players to see more players in a virtual simulation.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed to a network protocol for view replication over unreliable networks.

A first aspect described herein provide a method for scalable replication of object positions in virtual simulations. In an illustrative method, a computing device may determine a current position of an entity in a virtual simulation. The computing device may determine, based on the current position, a time derivative of the current position of the entity. The computing device may query a dictionary for the time derivative of the current position of the entity to obtain a particular index identifying a time derivative value that corresponds to the time derivative of the current position of the entity. The dictionary may comprise one or more time derivative value pairs associated with time derivatives of one or more previous positions of the entity. When the time derivative of the current position of the entity is in the dictionary, the computing device may encode the particular index. Further, the computing device may send the particular index to a client device.

A second aspect described herein provides another method for scalable replication of object positions in virtual simulations. In an illustrative method, a computing device may determine position values of an entity in a virtual simulation. The computing device may quantize the position values to be fixed-width integers. The computing device may determine, based on the quantized position values, a current position change of the entity in the virtual simulation. In addition, the computing device may determine, based on the current position change, a current acceleration of the current position change of the entity. Further, the computing device may query a dictionary for the current acceleration to obtain a particular index identifying an acceleration value that corresponds to the current acceleration. The dictionary comprises one or more acceleration value pairs associated with a previous acceleration of the entity. When the current acceleration is in the dictionary, the computing device may encode the particular index. The computing device may send the particular index to each client device connected to the virtual simulation.

In various embodiments, either or both methods may be performed by a data processing device, system and/or apparatus. In yet other embodiments the method may be embodied within a non-transitory computer-readable medium. The non-transitory computer-readable medium store instructions which, when executed by a processor, may cause a data processing system, device, or apparatus to perform the method for replicating states and/or views.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect mounting, connecting, coupling, positioning and engaging.

Figure 1:
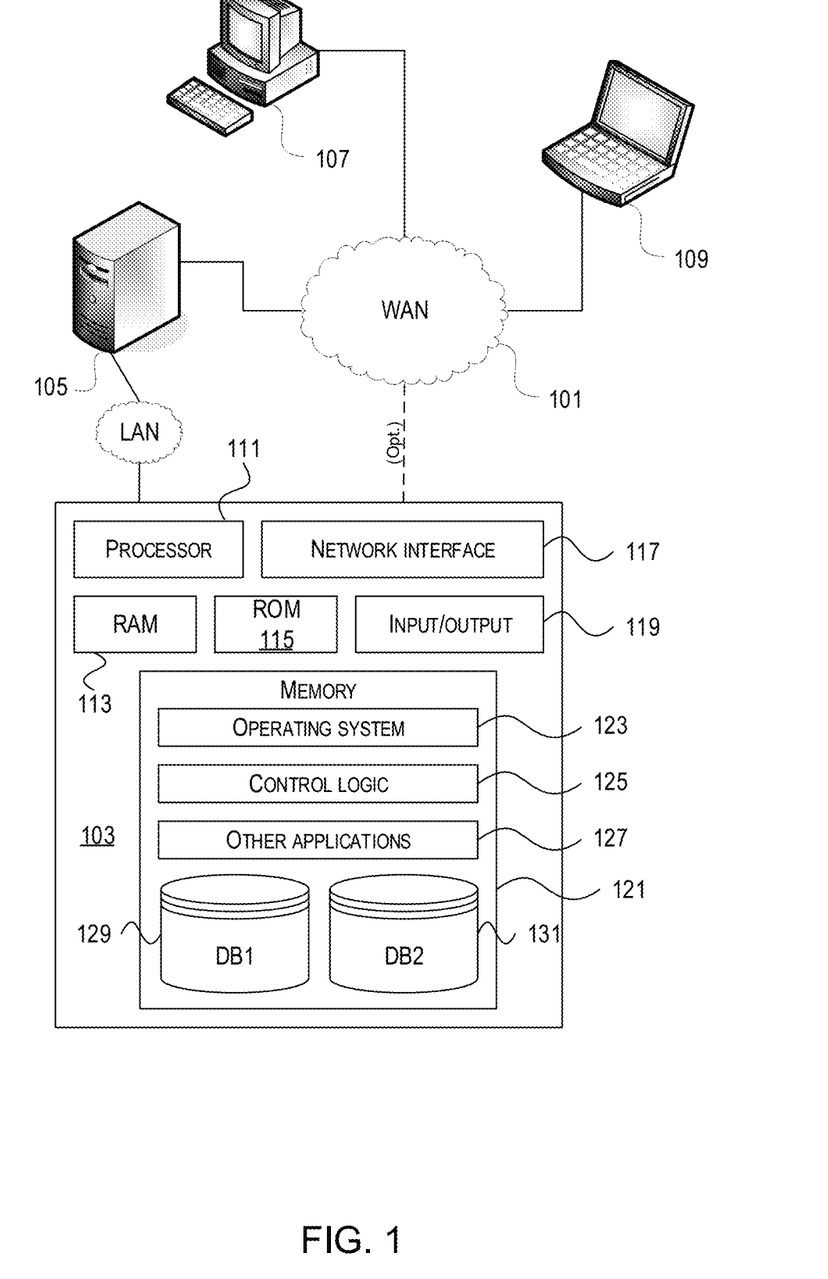
FIG. 1 illustrates an example of a network architecture and data processing device.

FIG. 1 illustrates one example of a network architecture and data processing device that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include a data server 103, a web server 105, and client computers 107, 109. The data server 103 provides overall access, control and administration of databases and control software for performing one or more illustrative aspects described herein. The data server 103 may be connected to the web server 105 through which users interact with and obtain data as requested. Alternatively, the data server 103 may act as a web server itself and be directly connected to the Internet. The data server 103 may be connected to the web server 105 through the network 101 (e.g., the Internet), via direct or indirect connection, or via some other network. Users may interact with the data server 103 using the remote computers 107, 109, e.g., using a web browser to connect to the data server 103 via one or more externally exposed web sites hosted by web server 105. The client computers 107, 109 may be used in concert with the data server 103 to access data stored therein, or may be used for other purposes. For example, from the client device 107 a user may access the web server 105 using an Internet browser, as is known in the art, or by executing a software application that communicates with the web server 105 and/or the data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by the web server 105 and the data server 103 may be combined on a single server.

Each component 103, 105, 107, 109 may be any type of known computer, server, or data processing device. The data server 103, e.g., may include a processor 111 controlling overall operation of the rate server 103. The data server 103 may further include RAM 113, ROM 115, a network interface 117, input/output interfaces 119 (e.g., keyboard, mouse, display, printer, etc.), and memory 121. I/O 119 may include a variety of interface units and drives for reading, writing, displaying, and/or printing data or files. The memory 121 may further store operating system software 123 for controlling overall operation of the data processing device 103, control logic 125 for instructing the data server 103 to perform aspects described herein, and other application software 127 providing secondary, support, and/or other functionality which may or may not be used in conjunction with other aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

The memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. The devices 105, 107, 109 may have similar or different architecture as described with respect to device 103. Those of skill in the art will appreciate that the functionality of the data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML, or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Figure 2:
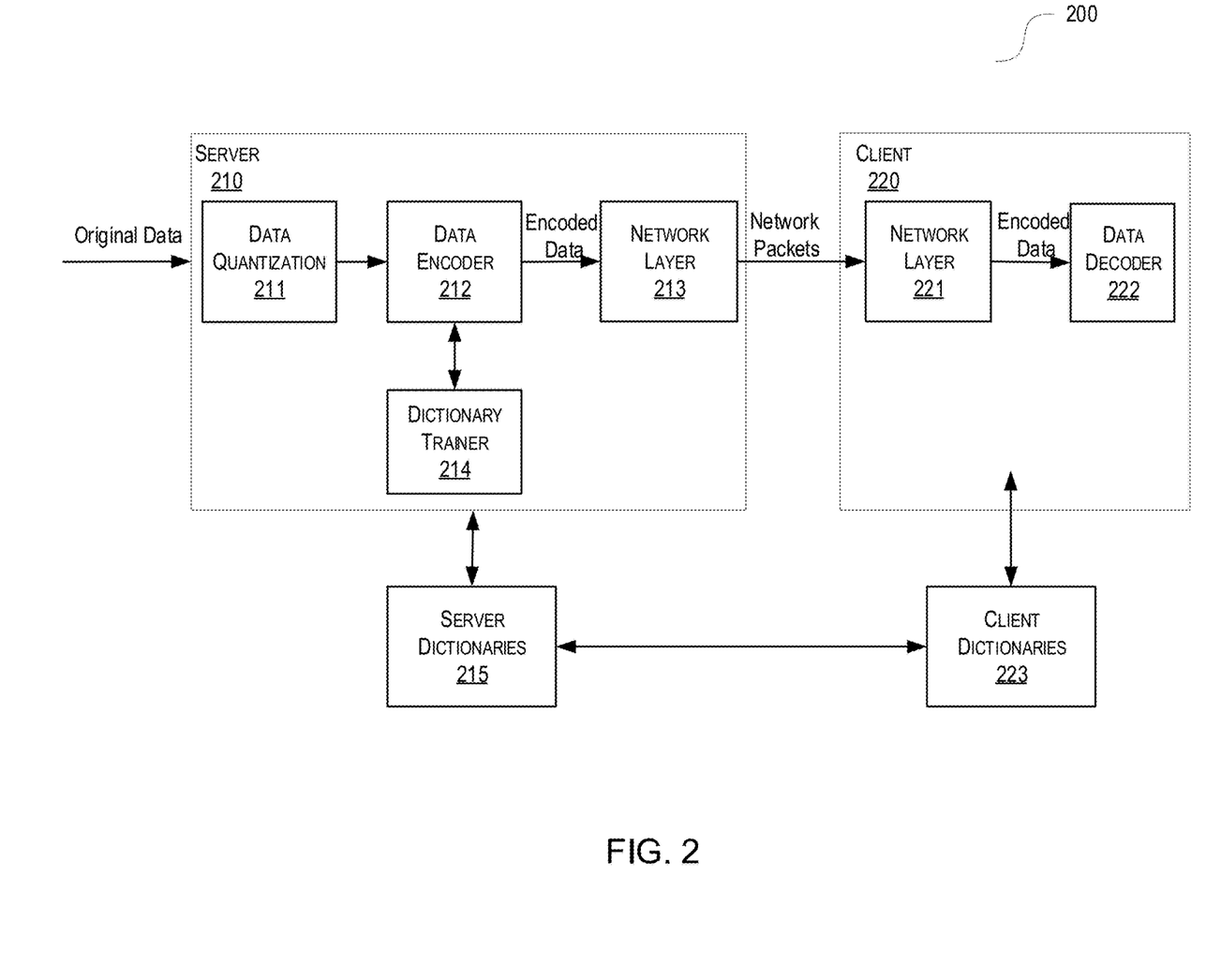
FIG. 2 illustrates an example of a communication system between a server and a client.

FIG. 2 shows an example of a communication system between a server and a client for replicating entity positions in a virtual simulation. In FIG. 2, a communication system 200 may comprise a server 210 and a client 220. The server 210 may be a computing device (e.g., the data server 103, the web server 105, a game server, a spatially-optimized game simulator) configured to encode entity position information and send the encoded data to the client 220 (e.g., the client computers 107, 109, a mobile phone, a tablet, a game terminal, a game server). For example, in a simulated world (e.g., a game world), a single client may receive live low-fidelity updates of tens of thousands of entities. The replication and synchronization of entity position information may be the basis for a massive-scale and immersive game environment, in which each player (e.g., represented by an entity) may see some players in the world at low fidelity and nearby players at higher fidelity.

The server 210 and the client 220 may share a view (e.g., a piece of state) of a game state. In a video game, a view may comprise information indicating the positions of one or more entities (e.g., objects) in the game world, map information associated with the one or more entities and/or other components of the game, and/or leaderboard information. An entity may represent a fundamental computational unit or another unit of a simulated world and may be graphically depicted in the simulated world. For example, in a city simulation, a simulated world may comprise one or more car entities, one or more pedestrian entities, one or more traffic signal entities, one or more road entities, one or more building entities, and the like. In another example, a simulated world may comprise one or more monster entities, one or more player entities, one or more weapon entities, one or more tree entities, one or more rock entities, and the like. In addition, an entity may comprise an artificial intelligence (AI) character/object and/or an avatar that represents a player.

The server 210 may communicate with a plurality of clients 220 and each client 220 may control one or more entities (e.g., control the movement of the one or more entities) or may be interested in one or more entities controlled by other clients. According to one or more aspects of the disclosure, the server 210 may encode entity position information and send the encoded data to each client connected to a virtual simulation. In this way, the entity position information may be computed just once for each client 220 and the same information may be sent to each client 220 by the server 210, which may substantially reduce computational complexity.

The server 210 may monitor and track the positions of each entity in a simulated world. For example, the server 210 may receive entity position information from each client (e.g., the client 220). The client may instruct an entity to move to a new position at a specific time point. The client may send the instruction to the server 210. The server 210 may then receive the instruction indicating the new position from the client. In another example, the server 210 may initiate an entity position change and may determine a new position by itself. In either case, the server 210 may obtain the entity position information at various time points (e.g., after each server update) during the simulation.

The entity position information may be updated at a predetermined rate. For example, the server 210 may update the simulated world at a predetermined frequency (e.g., 1-5 Hz) based on the types of the simulated world and/or a number of the connected clients. The entity position information may be updated based on the update frequency of the simulated world. In general, if the simulated world is updated more frequently, the entity position changes (e.g., entity position change deltas) may be smaller and more predictable.

The server 210 may send the entity position information to the client 220, so that the client 220 may replicate and reconstruct the entity positions based on the entity position information. The entity position information may be sent relative to an epoch (e.g., a specific time point) and/or the entity position information may comprise a unique epoch that is larger than the previous entity position information (e.g., the epoch associated with the current entity position change=the epoch associated with the previous entity position change+1). The server 210 may further encode the entity position information before sending to the client 220.

Accelerations of the movement of the entities may be predictable in a simulated world. For example, if an entity starts to deaccelerate, it may be likely that the entity will continue to deaccelerate. If an entity stands still, it may be likely that the entity will continue to stand still. Thus, the previous difference in position may be used to predict the next difference in position, and accelerations may be used to construct the entity position changes for low-precision transforms (e.g., position and/or rotation updates).

To more efficiently encode the entity position information and to allow each player to see more numbers (e.g., potentially all) of other players (e.g., entities), the server 210 may construct the entity position changes for low-precision transforms by obtaining derivatives of each entity's positions (e.g., velocities of entity positions, accelerations of entity positions, jerks of entity positions). For example, the server 210 may calculate an acceleration value for each entity position change of each entity in a simulated world. During a virtual simulation, the server 210 may, for each entity, store a history of N (N being an integer larger than 0) previous accelerations. For each combination of N accelerations (e.g., a combination of N previous accelerations and the current acceleration), the server may build a small dictionary for the current acceleration. For example, in the case of N=3, a dictionary for every combination of the last 3 accelerations may be built. When encoding a current acceleration of an entity, the server 210 may query the dictionary for the previous three accelerations, and determine whether the current acceleration is in the dictionary. In the case of N=1, a dictionary for each previous acceleration may be built and the server 210 may interpret the entity position changes as transitions through a Markov model (e.g., a Markov chain), relying on a tight transition distribution at each state for efficient entropy coding.

Each acceleration of an entity may be denoted by a vector (x, y, z). Other types of vectors such two-dimensional vectors may also be used. The acceleration vector may be an instantaneous acceleration obtained from the derivative with respect to the time of the velocity function of the entity. For example, if the simulated world is updated at 2 Hz, the current acceleration vector may be calculated based on the velocity change of the entity in the most recent 0.5 seconds and the previous acceleration vector may be calculated based on the velocity change of the entity in the previous 0.5 seconds prior to the most recent 0.5 seconds. Thus, the accelerations of the entities may be calculated and sent to the clients for replicating and synchronization of the entity positions among the clients.

Due to the predictable nature of the accelerations in a simulated world, each acceleration vector may be treated as a state in the Markov model. In the Markov model, the next acceleration vector of an entity may depend only on the previous acceleration vector of the entity. Thus, the next acceleration vector of the entity may be predicted only based on the previous acceleration vector of the entity. So the server 210 might not need to store one or more acceleration vectors prior to the previous acceleration vector. The Markov model of accelerations will be further described in connection with FIG. 3.

The server 210 may comprise a data quantizer 211, a data encoder 212, a network layer 213, and a dictionary trainer 214. Each of the data quantizer 211, the data encoder 212, the network layer 213, and the dictionary trainer 214 may be program modules integrated into the server 210 or executed by one or more other computers or devices as described herein. The server 210 may comprise one or more additional modules for obtaining and/or processing the entity position information. Each module may be located at one or more cloud servers and may communicate with the server 210 via the Internet.

The data quantization module 211 may be configured to quantize the accelerations of the entities. The entity positions may be originally denoted as floating-point position values. The data quantization module 211 may be configured to convert the floating-point position values to integers values (e.g., fixed-width integers). The data quantization module 211 may also quantize the entity acceleration values to be integers if needed. In this way, each acceleration vector may comprise three integers (x, y, z). The quantization of the accelerations may depend on the fidelity (e.g., half a meter, one meter in the simulated world) set by the server 210. The fidelity may indicate the level of accuracy allowed with respect to the entity positions. For example, a simulated world may be divided into a plurality of grids (e.g., square grids, hex grids) and each grid may be further divided into a plurality of layers. Each grid may comprise a plurality of cells and each cell may have an index (e.g., a vector (a, b, c)) identifying the location of the cell based on, for example, a coordinate system. An entity position may be indicated by the index of the cell. The fidelity may be set based on the size of the grids and the cells. The server 210 may determine entity position values in a simulated world and the data quantization module 211 may then convert the entities' floating-point positions to quantized values. The server 210 may calculate the entity acceleration values based on the quantized entity position values.

As discussed above, the acceleration values may be a tight probability distribution in a Markov model such that the current acceleration of a particular entity may be accurately predicted based on the previous acceleration of the entity. Dictionaries may be used together with the Markov model to improve the efficiency of encoding the entity position changes. The server 210 may query a server dictionaries 215 to obtain a particular index associated with a previous acceleration of the entity. The particular index may identify an acceleration value that corresponds to the current acceleration of the particular entity. The server dictionaries 215 may comprise one or more acceleration value pairs and each acceleration value pairs may comprise one or more most likely current accelerations of the particular entity for each previous acceleration. For example, if an entity's previous acceleration is (1, 2, 0), the server dictionaries 215 may comprise a list of likely next state dictionaries (e.g., a local dictionary determined based on the previous acceleration) for the previous acceleration (1, 2, 0). The list of likely next state dictionaries may comprise a most common next state (5, 2, 0), a second most common next state (3, 3, 0), and a third most common next state (0, 3, 0) for the previous acceleration (1, 2, 0). Each likely next state in the next state dictionaries may be uniquely identified by an index. For example, the most common next state (5, 2, 0) may be identified by an index of 0, the second most common next state (3, 3, 0) may be identified by an index of 1, and the third most common next state (0, 3, 0) may be identified by an index of 2.

The server dictionaries 215 may also comprise a global dictionary for all entities in the simulated world. The global dictionary may comprise a list of the most common accelerations among all the entities in the simulated world. For example, a most common acceleration for all entities in the simulated world may be (0, 0, 0), a second most common acceleration for all entities in the simulated world may be (1, 0, 0), and a third most common acceleration for all entities in the simulated world may be (0, 1, 0). Each common dictionary may be uniquely identified by an index. In general, the history-based next state dictionaries may be preferred over the global dictionary, due to the probability of the dictionary index being smaller (as the dictionary is smaller with a tighter distribution).

Additionally, the server dictionaries 215 may also comprise dictionaries for one or more areas of the simulated world. Because entities may tend to have certain acceleration patterns in some areas or terrains of the simulated world, the server dictionaries 215 may store next state dictionaries that correspond to particular acceleration patterns in the one or more areas of the simulated world. For example, in a mountain area, a play may tend to climb in a direction at a decreasing acceleration, thus if the previous acceleration is (1, 0, 2), the most likely current acceleration may be (1, 0, 1). The next state dictionaries for a previous acceleration in the mountain area may be more accurate compared to the generic next state dictionaries for the same previous acceleration, which may apply to accelerations of any entities in the simulated world. In general, area-based next state dictionaries may be preferred over the generic next state dictionaries, due to the probability of the dictionary index being smaller. The building and training the server dictionaries 215 will be further described in connection with the dictionary trainer 214 and FIG. 5.

If the current acceleration of the particular entity is not in the next state dictionaries or the global dictionary, no dictionary index might be sent and the current acceleration values may be encoded explicitly. A tag such as GLOBAL CONTROL INDEX may be used to indicate that the current acceleration values will be encoded explicitly. The tag may be then encoded and sent to the client 220. Many methods may be used to encode the tag and/or the current acceleration values. For example, integer coding methods such as unary coding, Rice coding, or interpolative coding may be used to encode the specific current acceleration values.

To improve the coding efficiency of the entity position changes, instead of sending the actual current acceleration of the entity, a dictionary index that identifies the current acceleration of the entity may be encoded and sent to the client 220. The dictionary indices may be entropy encoded before the start of a virtual simulation or a session of the virtual simulation. Alternatively, the dictionary indices may also be entropy encoded after a particular dictionary is queried and ready to be sent to the client.

The data encoder 212 may encode the dictionary indices used for sending the accelerations of the entities. For example, entropy coding may be used to assign a unique symbol for each dictionary index. The entropy coding of the dictionary indices may have a better compression ratio if there is a tight distribution of dictionary indices being encoded (e.g., one index is encoded significantly more often than other indices). Table 1 below shows an example of Huffman coding of dictionary indices based on the frequencies/probabilities of the occurring of the dictionary indices in the training of the dictionary. As shown in Table 1, the data encoder 212 may encode more common indices (e.g., index 0) with fewer bits of Huffman code, so that the efficiency of transmitting the entity position information may be improved.

TABLE 1

| Dictionary Index | Frequency/ Probability | Huffman Code | Total Bits |
| --- | --- | --- | --- |
| 0 | 100/0.5 | 1 | 100 |
| 1 | 40/0.2 | 01 | 80 |
| 2 | 30/0.15 | 001 | 90 |
| 3 | 20/0.1 | 0000 | 80 |
| GLOBAL_CONTROL_INDEX | 10/0.05 | 0001 | 40 |

The dictionary trainer 214 may build and train the server dictionaries 215. For example, the dictionary trainer 214 may track the frequencies of accelerations that occur in a simulated world to build a global dictionary. The dictionary trainer 214 may use a counter for the frequency of each acceleration vector and a plurality of counters for the frequencies of each acceleration vector after a particular previous acceleration vector. In this way, the dictionary trainer 214 may construct a global dictionary that comprises a list of the most common accelerations among all the entities in the simulated world. The faster the update rate of the simulation, the global dictionary may be constructed more accurately.

In addition, the dictionary trainer 214 may track the frequencies of accelerations that occur after a particular previous acceleration in the simulated world to build the next state dictionaries. The dictionary trainer 214 may construct next state dictionaries that comprises a plurality of acceleration vector pairs. Each pair may comprise a current acceleration vector and a previous acceleration vector. Each pair may be associated with a counter. The dictionary trainer 214 may add 1 to a particular pair when the current acceleration vector in the pair occurs after the previous acceleration vector. The pairs that have the highest numbers may be built into the next state dictionaries.

The network layer 213 may send data packets (e.g., network packets) comprising the encoded one or more dictionary indices to the client 220 using one or more network protocols over a communication channel (e.g., the Internet) to synchronize the entity positions of all participating clients. The network layer 212 may comprise a networking library or stack (e.g., an Asio library). The network library may be responsible for transmitting data packets to the client 220 over the communication channel.

The client 220 may be configured to receive the encoded data and update the entity positions based on the encoded data. For example, the client 220 may decode the received data, and synchronize the entity position with the server 210 by processing (e.g., applying, replicating) the decoded data. The client 220 may comprise a network layer 221 and a data decoder 222. Each of the network layer 221 and the data decoder 222 may be program modules integrated into the client 220 or executed by one or more other computers or devices as described herein. The client 220 may comprise one or more additional modules for decoding and/or processing the entity position information. Each of the modules may be located at one or more cloud servers and may communicate with the client 220 via the Internet.

The network layer 221 may receive the data packets from the network layer 213 and send the encoded data to the data decoder 222. The data decoder 222 may receive the encoded data and decode the encoded data. In order to decode the encoded data, the data decoder 222 may need to know the compression algorithm that was used for encoding the data. Decoding the encoded data may reconstruct the original data (e.g., the dictionary index). After obtaining the dictionary index that identifies the current acceleration, the client 220 may query client dictionaries 223 to obtain the current acceleration identified by the dictionary index. The client dictionaries 223 may be the same as the server dictionaries 215 so that the client can reconstruct the correct current acceleration based on the dictionary index. The client dictionaries 223 may be comprised in the client 220 or may be stored in a separate server (e.g., a remote server, a cloud server) that can be accessed by the client 220.

The server 210 may send the server dictionaries 215 to the client 220 (or a computing device that stores the client dictionaries 223) before sending any dictionary index to the client 220. For example, after building the server dictionaries 215 and before sending an initial state of the simulated world or an encoded dictionary index to the client 220, the server 210 may send the server dictionaries 215 to the client 220. The initial state of the simulated world may comprise position information of each entity. If the server dictionaries 215 are updated, an updated version of the server dictionaries 215 or only the updates to the server dictionaries 215 may be immediately sent to the client 220.

Figure 3:
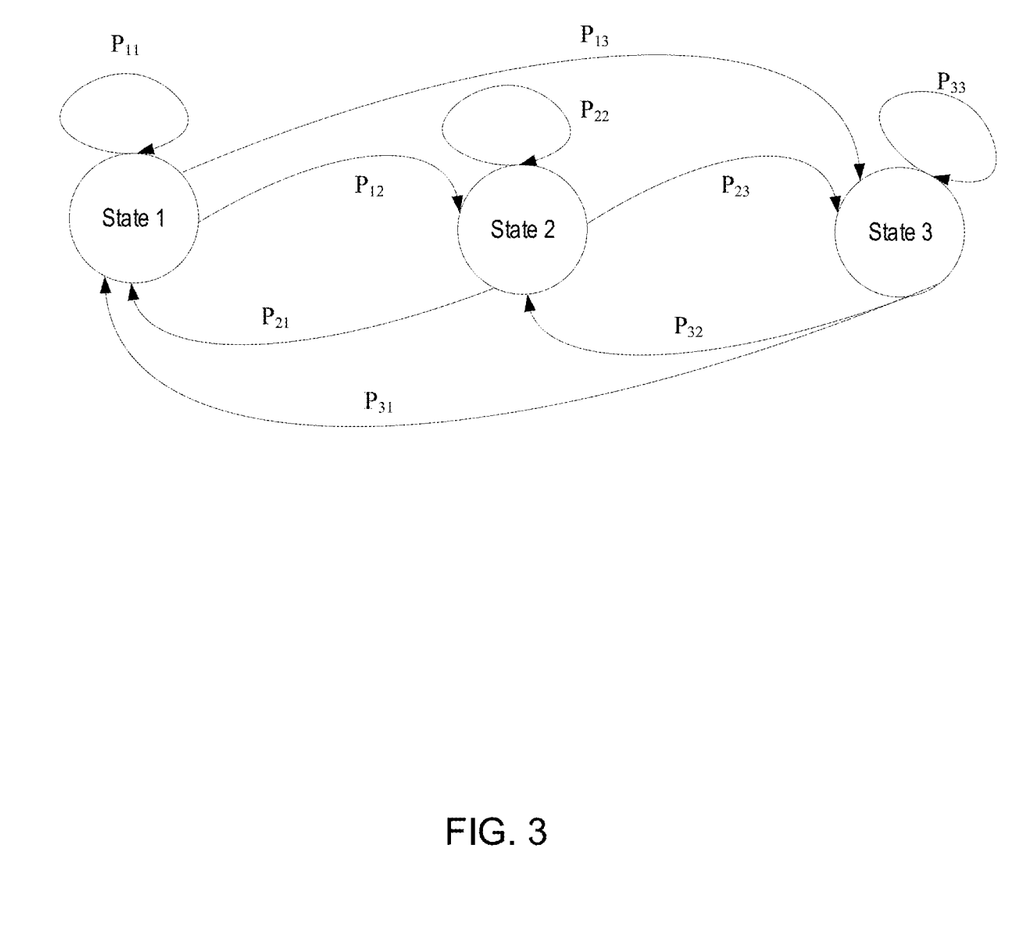
FIG. 3 illustrate an example of a Markov model for the replication of entity positions in virtual simulations.

FIG. 3 illustrate an example of a Markov model for replication of object positions in virtual simulations. A Markov model may be a discrete-time stochastic process on a number of states defined based on a transition probability matrix (M) with rows i and columns j–M=(Pij). A transition probability Pij may correspond to the probability that the state at time t+1 is j, given that the state at time t is i. So each row in the matrix M may be a distribution. Each acceleration vector may be treated as a state in the Markov model. For example, as shown in FIG. 3, a previous acceleration vector may be represented by state 1, a current acceleration vector may be represented by state 2, and a next acceleration vector may be represented by state 3. The transition probability from one state to another state (e.g., state 1, state 2, state 3, etc.) may be denoted by Pij, where i is the first state and j is the second state.

The transition probability from one state to another state may be calculated before the start of a virtual simulation by counting the frequencies of each acceleration vector after each particular previous acceleration vector and comparing the frequencies of each acceleration vector with the frequencies of other acceleration vectors after each particular previous acceleration vector. For example, the most common (e.g., the most likely) acceleration vector after a previous acceleration vector (0, 0, 0) may be determined to be (0, 0, 0) after counting each acceleration vector after each acceleration vector (0, 0, 0) and comparing each acceleration vector with other acceleration vectors after each acceleration vector (0, 0, 0). So the transition probability from a state (0, 0, 0) to the same state (0, 0, 0) may be determined based on the comparison.

The most common acceleration vector may be indicated by the smallest dictionary index. Therefore, the smallest dictionary index (e.g., 0) may be assigned to (0, 0, 0) corresponding to a previous state (0, 0, 0). In this case, the server 210 might not need to send the actual acceleration vector (0, 0, 0) to the client 220. Instead, the server 210 may send the encoded dictionary index (e.g., a Huffman code of index 0) to the client 220 to save the bandwidth and reduce computational complexity.

Figure 4A:
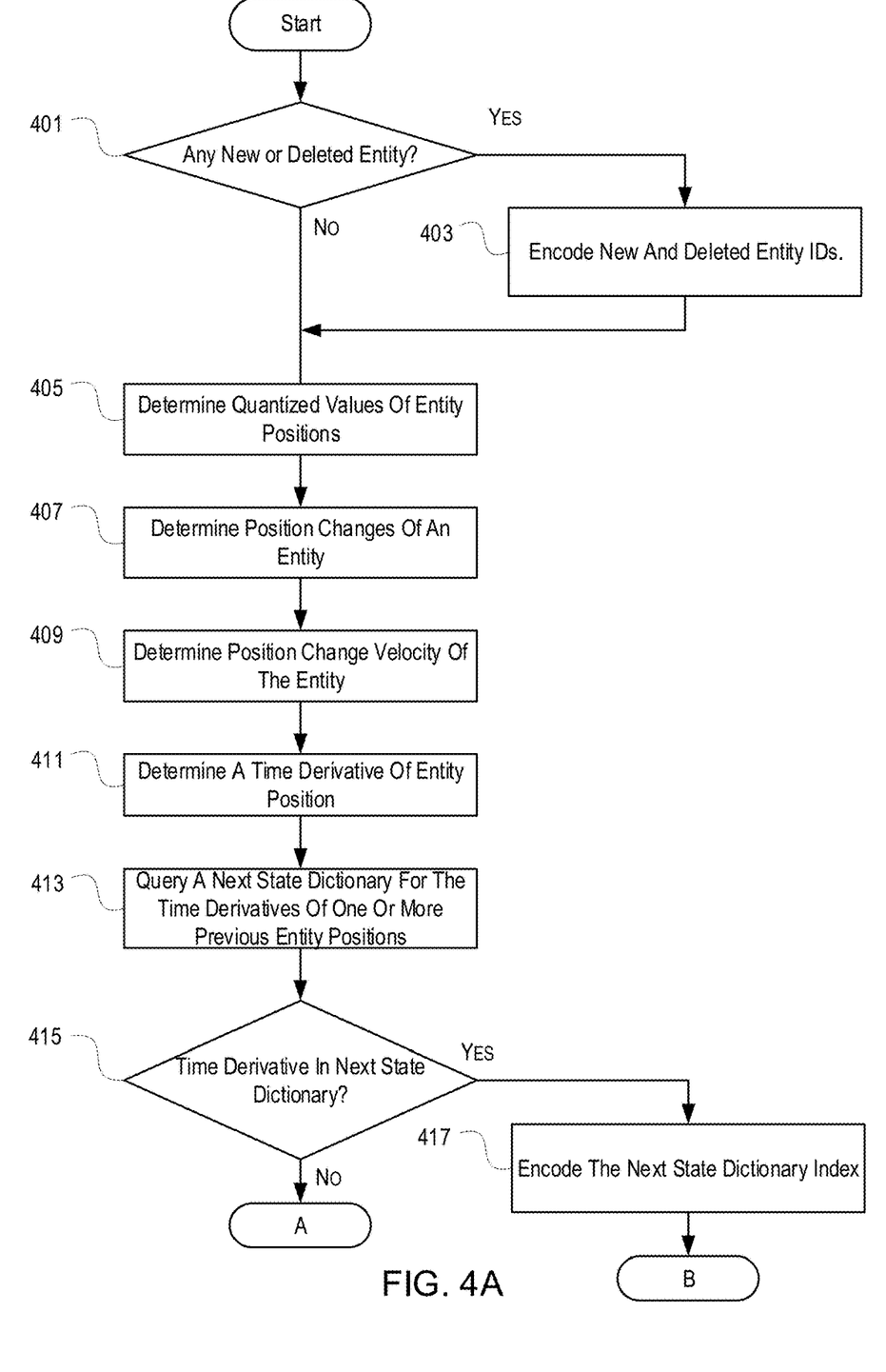
FIGS. 4A-4B is a flow chart showing an example method for compression of entity position change information.
Figure 4B:
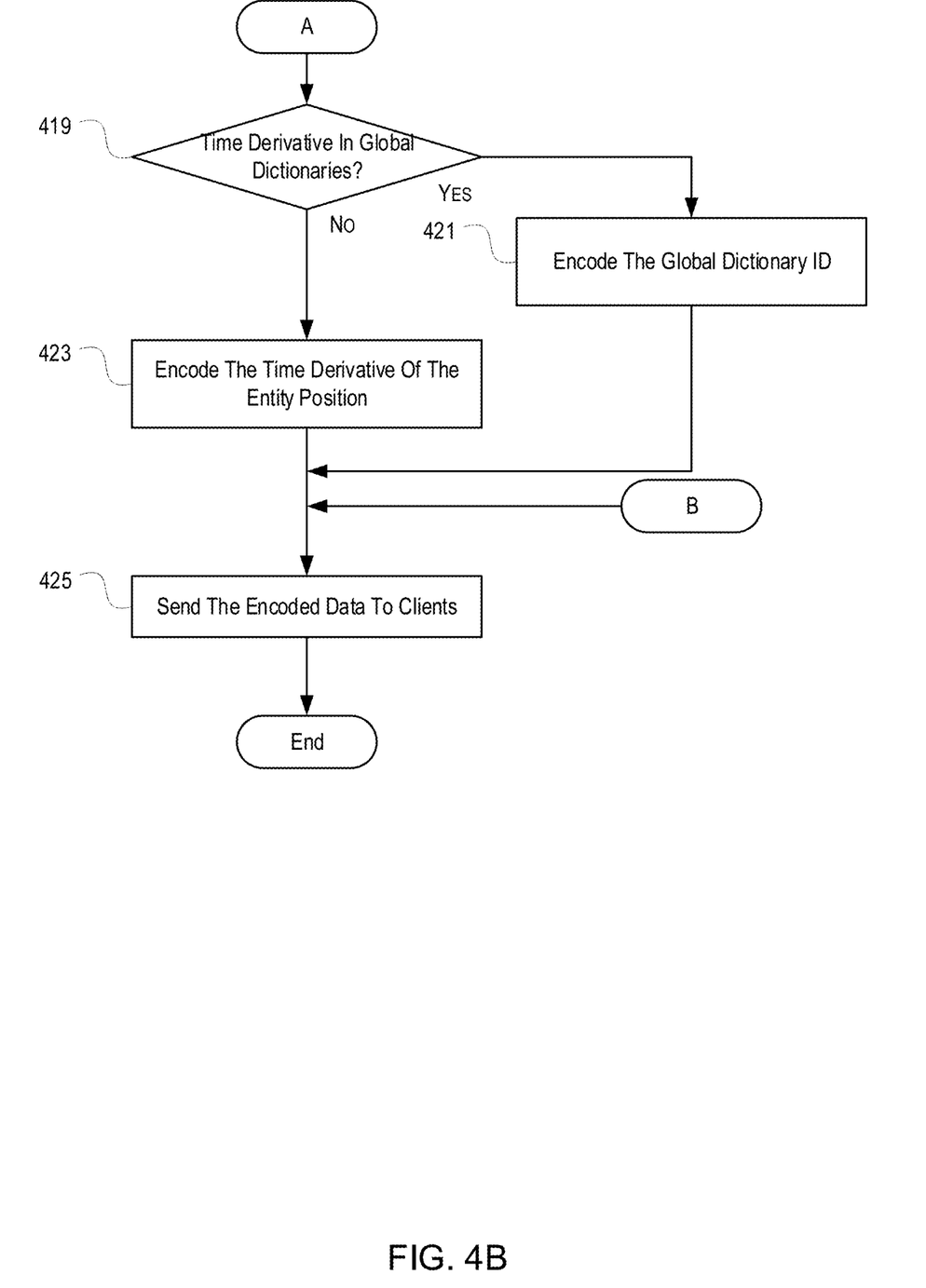

FIGS. 4A and 4B is a flow chart of an example method for compression of entity position change information. Steps of the method may comprise lossless compression on entity position information in a virtual simulation. Steps of the method may also comprise sending encoded entity position information to one or more client devices. The description of FIGS. 4A and 4B includes examples of computing devices that may perform various steps. However, any or all of those steps (and/or other steps) may be performed by one or more other computing devices. One or more steps may be combined, sub-divided, omitted, or otherwise modified, and/or added to other steps. The order of the steps may be modified.

The example method may sacrifice some bandwidth at a server (e.g., the server 210) to efficiently encode the low-fidelity transforms for all players, and use the remaining bandwidth for high-fidelity transforms of nearby players. The average transform size for low-fidelity transforms may become approximately 0.5 bytes or less using the example method, which may be a significant improvement over conventional methods (e.g., the transform size is reduced by 26 times). So, for each player, 10 KB/s of data may be used to stream (e.g., send, transmit) low-fidelity (2 Hz) transforms of every player, and 15 KB/s may be used to stream high-fidelity (30 Hz) transforms of the nearest players (e.g., 38 nearby players). Because a player may only need to directly interact with nearby players, this method may provide an immersive feel of a 10,000-player game while using the same bandwidth. The players may experience a large-scale connectedness previously impossible in a simulation.

At step 401, a computing device (e.g., the sender 210) may determine whether any new entities have been created (e.g., added to a simulated world) or whether any entities have been deleted from a simulated world. In the simulated world, each entity may be uniquely identified by an entity ID. A new entity ID may be assigned to a newly created entity.

At step 403, if the computing device determines that one or more new entities have been created or that one or more entities have been deleted from the simulated world, the computing device may encode the newly created and/or deleted entity ID(s). The computing device may encode newly created entity information (e.g., a type of entity, the time of creation) in ascending order and send the newly created entity information (e.g., included in a data packet) to the clients (e.g., the client 220). The client may decode the newly created entity information in ascending order. This may ensure that the computing device and the clients have a guaranteed matched view of the set of entities in the simulated world. Due to entity IDs being unique, no entity IDs might need to be transmitted to the clients for existing entities.

At step 405, the computing device may determine quantized positions of entity positions. As discussed above, entity positions may be indicated using a coordinate system. The computing device may convert the entities' floating-point positions to quantized values. For example, with the fidelity of 0.5 meters, the computing device may double the floating-point values and round to the nearest integers. As an example, if an entity has a position (4.2, 6.7, 5.1) in a simulated world, the computing device may quantize the entity position to be (8, 13, 10) based on the fidelity of 0.5 meters.

At step 407, the computing device may determine an entity position change of an entity. For example, the computing device may determine the entity position changes based on an update rate (e.g., a game tick) of the simulated world. An entity may move from a first location with a first quantized position value to a second location with a second quantized position value.

At step 409, the computing device may determine a position change velocity of the entity. For example, the computing device may calculate the position change velocity based on the entity position change of an entity. The position change velocity may also be quantized if the determined position change velocity is not an integer-based vector.

At step 411, the computing device may determine a time derivative of the position of the entity. The time derivative of the position of the entity may comprise any number of time derivative of the current position of the entity. For example, using a second time derivative of the current position of the entity, the computing device may calculate the position change acceleration based on the position change velocity of the entity and/or the previous position change acceleration of the entity. The position change acceleration may also be quantized if the determined position change acceleration is not an integer-based vector. The computing device may store the position change acceleration of the entity, but the stored information may be removed after the computing device has obtained two additional position change accelerations of the entity. The computing device may always store the previous acceleration of the entity and the current acceleration of the entity.

At step 413, the computing device may query next state dictionaries for the time derivatives of one or more previous positions of the entity (e.g., previous accelerations). For example, the computing device may first determine an area in which the entity is located, and may determine which dictionaries may be used based on the determined area. If the computing device determines that the entity is located in a particular area that corresponds to particular next state dictionaries, the computing device may query the server dictionaries 215 for the new state dictionaries corresponding to the area for the position change acceleration based on a previous acceleration. If the computing device determines that the entity is not located in a particular area, the computing device may query the server dictionaries 215 for generic new state dictionaries for the position change acceleration based on a previous acceleration. For example, if an entity had an acceleration of (1, 2, 0) in the previous state (e.g., a previous update), and now has a current acceleration (e.g., the determined position change acceleration) of (2, 3, 0), the computing device may query the next state dictionaries for the previous acceleration (1, 2, 0). The next state dictionaries for the previous acceleration (1, 2, 0) may comprise a list of likely current acceleration (e.g., states) for the previous acceleration (1, 2, 0). For example, the next state dictionaries for the previous acceleration (1, 2, 0) may comprise an index 0 indicating that a most common next acceleration for (1, 2, 0) is (5, 2, 0), an index 1 indicating that a second most common next acceleration for (1, 2, 0) is (3, 3, 0), and an index 2 indicating that a third most common next acceleration for (1, 2, 0) is (0, 3, 0). Each determined acceleration may be treated as a state in a Markov model and the entity position changes may be entropy encoded through the Markov model for each entity.

At step 415, the computing device may determine whether the determined time derivative of the position of the entity is in the next state dictionaries for the time derivatives of one or more previous positions of the entity. For example, the computing device may determine whether the current acceleration of (2, 3, 0) is in the next state dictionaries for the previous acceleration (1, 2, 0).

At step 417, if the computing device determines that the determined time derivative of the position of the entity is in the next state dictionaries for the time derivatives of one or more previous positions of the entity, the computing device may encode a next state dictionary index. For example, if the determined position change acceleration of the entity is (5, 2, 0) and the previous acceleration is (1, 2, 0), and (5, 2, 0) is in the next state dictionaries for the previous acceleration (1, 2, 0), the computing device may encode the dictionary index 0 using a probability-trained entropy encoder (e.g., data encoder 212).

At step 419, if the computing device determines that the determined time derivative of the position of the entity is not in the next state dictionaries for the time derivatives of one or more previous positions of the entity, the computing device may determine whether the determined time derivative of the position of the entity is in a global dictionary. The global dictionary may comprise a list of the most common time derivatives among all the entity positions in the simulated world. For example, the global dictionary may comprise an index 0 indicating that the most common acceleration for all entities in the simulated world is (0, 0, 0), an index 1 indicating that a second most common acceleration for all entities in the simulated world is (1, 0, 0), and an index 2 indicating a third most common acceleration for all entities in the simulated world may be (0, 1, 0).

A step 421, if the computing device determines that the time derivative of the position of the entity is in the global dictionary, the computing device may encode the sum of the size of the next state dictionaries for the time derivative of the previous position of the entity and the global dictionary index. For example, if the determined position change acceleration of the entity is (0, 1, 0), which corresponds to index 2 of the global dictionary, the computing device may encode 5 (3+2, 3 being the size of the next state dictionaries for the previous acceleration (1, 2, 0)).

A step 423, if the computing device determines that the determined time derivative of the position of the entity is not in the global dictionary, the computing device may encode the determined time derivative of the position of the entity explicitly. For example, the computing device may encode the individual values in the acceleration vector. In addition, a control index (e.g., a tag such as GLOBAL CONTROL INDEX) may be created to indicate that the current acceleration values will be encoded explicitly. The computing device may also encode the control index.

A step 425, the computing device may send the encoded data to one or more clients (e.g., the client 220). The computing device may send the encoded data to all the clients connected to the simulated world, so that each of the client may be able to receive the entity position updates and see other players in real-time or near real-time. The encoded data may comprise an entropy-coded next state dictionary index, an entropy-coded value that is the sum of the size of the next state dictionary and the global dictionary index, or an encoded control index and encoded actual values of the determined entity position acceleration. To send the encoded data, the computing device may generate a data packet that comprises the encoded data and send the data packet to the clients via a reliable network. The data packet may comprise a sequence number identifying the data packet. Additional details of a network protocol for sending the encoded data will be further described in connection to FIG. 6.

Steps 401-425 may be repeated to transmit entity position updates to the clients and to maintain state consistency between the computing device and the clients. The state consistency may ensure accurate and complete entity position replication between the computing device and the clients. The computing device may determine entity position changes based on an ongoing predetermined time interval (e.g., a game tick).

Figure 5:
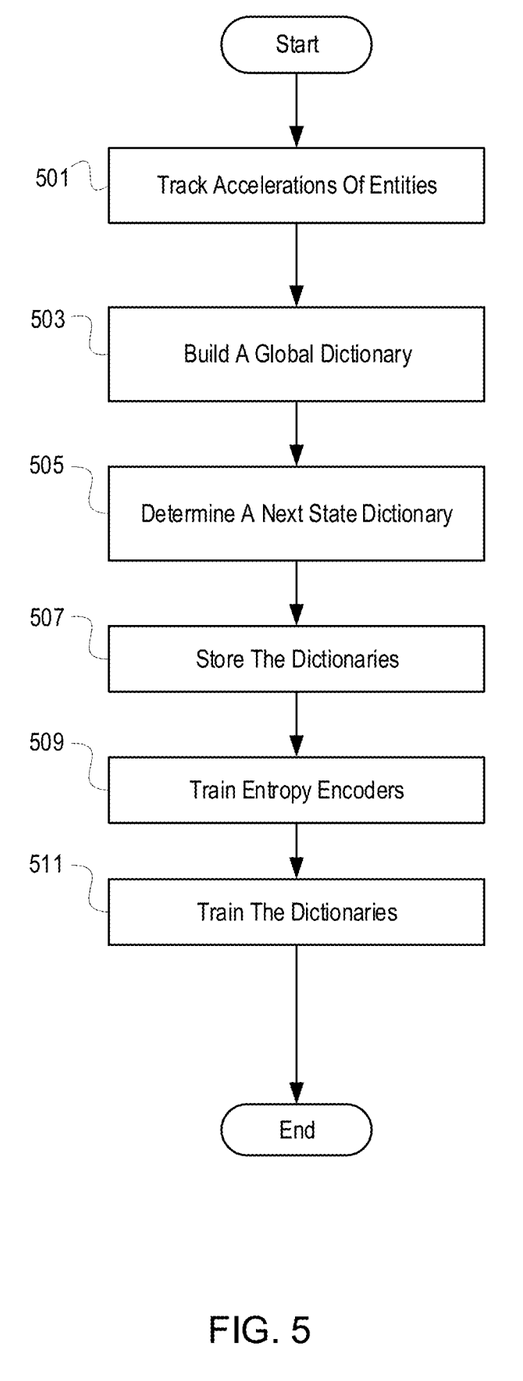
FIG. 5 is a flow chart showing an example method for building a dictionary used in the replication of entity positions.

FIG. 5 is a flow chart showing an example method for building and training dictionaries used in the replication of object positions. Steps of the method may comprise building and training a global dictionary and next state dictionaries for sending entity position information to clients. The description of FIG. 5 includes examples of computing devices that may perform various steps. However, any or all of those steps (and/or other steps) may be performed by one or more other computing devices. One or more steps may be combined, sub-divided, omitted, or otherwise modified, and/or added to other steps. The order of the steps may be modified.

At step 501, a computing device (e.g., the server 210) may track and calculate accelerations of entities of a simulated world. The computing device may first obtain the positions of each entity and then calculate the current accelerations of the entities based on updated positions of the entities and previous accelerations of the entities. The computing device may track and calculate accelerations for a specific area of the simulated world. For example, the computing device may divide the simulated world into a plurality of areas based on a type of the area, and separately track and calculate accelerations for each type of area. The calculated results may be only applied to the entities in that area. For example, on a steep hill in the simulated world, entities may be more likely to travel at a particular angle. Therefore, the dictionaries built based on the steep hill area may be more accurate for entities in the steep hill area.

At step 503, the computing device may build a global dictionary that identifies one or more most common accelerations of the simulated world. For example, the computing device may count the number of times that each acceleration occurs in the simulated world for a time period. The computing device may determine that acceleration vector (0, 0, 0) is the most common acceleration because it is very likely that a velocity of the movement of an entity does not change during a game tick.

At step 505, the computing device may build the next state dictionaries for each previous acceleration. For example, the computing device may determine one or more acceleration value pairs and each acceleration value pairs may comprise one or more most likely current accelerations of a particular entity for each previous acceleration. In addition, the computing device may build the next state dictionaries for every combination of a plurality of previous accelerations. For example, the computing device may construct a plurality of pairs of [previous N (N>1) accelerations]→[current acceleration] based on the calculated accelerations of the entities in the simulated world.

The computing device may build next state dictionaries for one or more particular entities. For example, the particular entities may be selected based on a time that the entities have existed in the simulated world. If a game has mechanics that slow down the movement of the entity the longer the entity has been alive, the acceleration associated with the entity may be affected by the time the entity has existed in the simulated world. Thus, the computing device may modify the next state dictionaries for each previous acceleration for those entities as those entities' accelerations tend to decrease over time.

At step 507, the computing device may store the global dictionary and the next state dictionaries. For example, the computing device may store the global dictionary and the next state dictionaries in the server dictionaries 215. Specifically, the computing device may store a number of most common accelerations of the simulated world and the determined acceleration value pairs in the server dictionaries 215.

At step 509, the computing device may train one or more entropy encoders (e.g., the data encoder 213). The computing device may obtain the frequencies of the actual encoded values (e.g., the dictionaries indices). For example, for every dictionary index encoded, the computing device may add 1 to that index. In addition, the computing device may also add 1 to GLOBAL CONTROL INDEX in the main index frequencies. Further, for each explicit acceleration value, the computing device may add 1 to each acceleration integer. For example, if the current acceleration is (2, 3, 0) and the previous acceleration is (1, 2, 0), and the current acceleration is in neither the next state dictionaries or the global dictionary, the computing device may add 1 to the value (2), (3) and (0) respectively. After a session of a simulated world or a predetermined period of time, the computing device may use these frequencies to train the entropy encoders to generate, for example, a Huffman code for each value, as shown in Table 1. The computing device may have a separate entropy encoder for the dictionary indices, and may have a separate entropy encoder for each of the explicit acceleration values X, Y, and Z.

At step 511, the computing device may train (e.g., modify, update) the global dictionary and the next state dictionaries. As an example, if a new feature (e.g., a new road, a new bridge, an obstacle, a vehicle) is added to the simulated world or an old feature is deleted from the simulated world, the computing device may recalculate the frequencies of the accelerations of each entity in the simulated world. The computing may obtain accelerations from a group of entities that are interacting with the newly added feature or previously interacted with the deleted feature. The computing may then determine whether the global dictionary and the next state dictionaries need to be updated based on whether the newly added feature or the deleted feature may greatly affect the movement of the entities in the simulated world. Network protocol implementations may expose an application programming interface (API) to enable submitting new data (e.g., new accelerations) to training, and send the updated global dictionary and the updated next state dictionaries to the clients.

Additionally or alternatively, the computing device may periodically train or retrain the global dictionary and the next state dictionaries. For example, the computing device may determine to train the dictionaries after one or more game sessions of a simulated game. A game session may comprise a duration of time during which an individual user (e.g., player) stays connected to a game server without being asked to connect or reconnect to the game server. The current session may end when the user is disconnected from the game server or the user is asked to join or rejoin a game.

Additionally or alternatively, the computing device may train the global dictionary and the next state dictionaries based on a time since the virtual simulation started. For example, a game may impose a time constraint for players to complete a task, so players tend to accelerate near the end of the time constraint. In this case, the computing device may modify the global dictionary and the next state dictionaries to reflect the accelerated speeds after a certain period(s) of time so that the entity position changes may be better predicted and the dictionary indices may have a better compression ratio.

Figure 6:
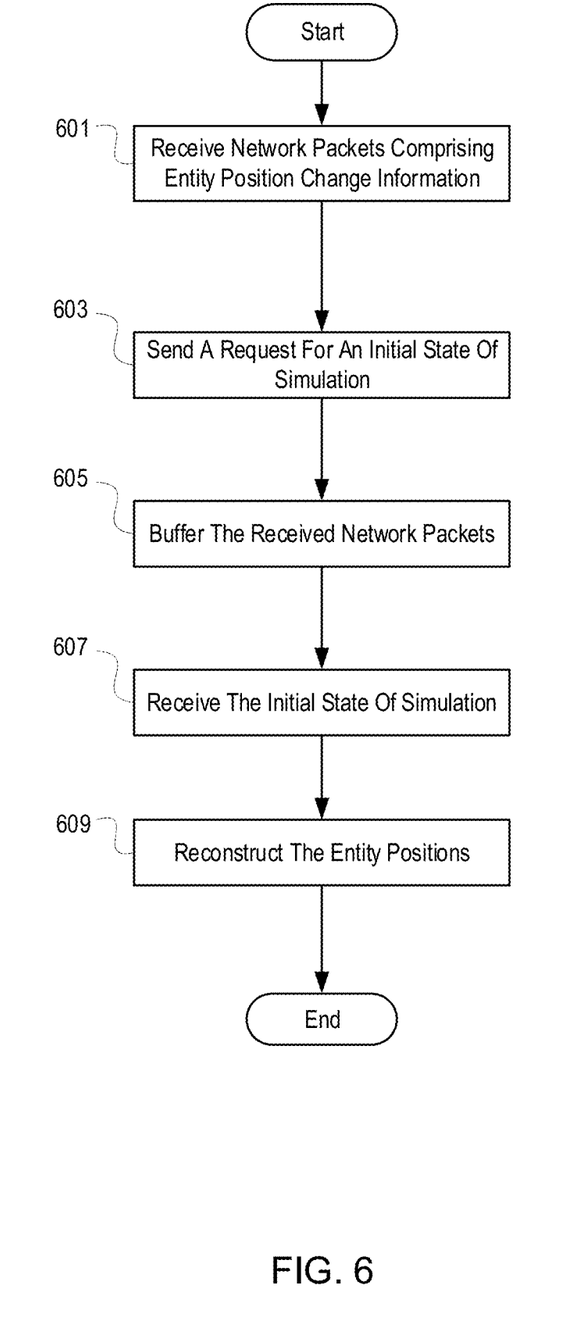
FIG. 6 is a flow chart showing an example method for a network protocol for the replication of entity positions in virtual simulations.

FIG. 6 is a flow chart showing an example method for a network protocol for the replication of object positions in virtual simulations. Steps of the method may comprise a network protocol for an efficient and accurate entity position replication over a reliable network. Steps of the method may comprise receiving encoded entity position information and reconstructing entity positions. The description of FIG. 6 includes examples of computing devices that may perform various steps. However, any or all of those steps (and/or other steps) may be performed by one or more other computing devices. One or more steps may be combined, sub-divided, omitted, or otherwise modified, and/or added to other steps. The order of the steps may be modified.

At step 601, a computing device (e.g., the client 220) may receive network packets comprising entity position change information. The entity position change information may comprise the encoded dictionary index and/or the encoded acceleration values of one or more entities. The computing device may choose to receive entity position change information of only the entities that the computing device is interested in. Alternatively, position change information of all entities in a simulated world may be sent to the computing device.

At step 603, the computing device may send a request for an initial state of a simulated world. The initial state of the simulated world may comprise position values of an initial state of each entity in the simulated world. If the computing device has not received an initial state of the simulated world, the computing device may send a request to a server (e.g., the server 210). The server, after receiving the request or without receiving such request, may send an initial state of the simulated world to the computing device.

At step 605, the computing device may buffer the received network packets before receiving the initial state of the simulated world. Because the computing device does not have the initial state of the simulated world, the received network packets might not be immediately processed or applied. The computing device may buffer the received network packets in a temporary storage.

At step 607, the computing device may receive the initial state of a simulated world. The initial state may comprise an epoch integer, and each received network packet may also comprise an epoch integer. The epoch integer comprised in each network packet may be larger than the epoch integer comprised in the initial state. After receiving the initial state, the entity position change information may be applied based on a consecutive order of the epoch integer comprised in the network packet. In some examples, the computing device may only request the initial state of the simulated world after receiving at least the first network packet, to ensure that the network packet received by the computing device has an epoch that immediately follows the epoch of the received initial state.

At step 609, the computing device may reconstruct the entity positions. For example, the computing device may reconstruct the entity positions based on the received initial state of the simulated world and the received data packets. The computing device may decode the data comprised in the data packet by querying dictionaries (e.g., the client dictionaries 223). The computing device may then obtain an updated acceleration of an entity based on the queried dictionaries. An updated entity position may be reconstructed based on the updated acceleration of the entity. In some examples, the computing device may send an acknowledge message to the server indicating that the data packets have been received. The computing device may constantly receive one or more data packets from the server, and may reconstruct the entity positions of all entities in the simulated world immediately after receiving the data packets.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

What is claimed is:

1. A method comprising:
    determining by a computing device, a current position of an entity in a virtual simulation;
    determining, based on the current position, a time derivative of the current position of the entity;
    querying a global dictionary for the time derivative of the current position of the entity, wherein the global dictionary comprises a plurality of common time derivatives associated with positions of a plurality of entities in the virtual simulation;
    based on a determination that the time derivative of the current position of the entity is not in the global dictionary, encoding the time derivative of the current position of the entity;
    determining an index identifying a time derivative value that corresponds to the time derivative of the current position of the entity;
    encoding the index; and
    sending the encoded index to a client device.

2. The method of claim 1, further comprising:
    querying a second dictionary for the time derivative of the current position of the entity, wherein the second dictionary comprises one or more time derivative value pairs associated with time derivatives of one or more previous positions of the entity.

3. The method of claim 1, further comprising:
    determining that the time derivative of the current position of the entity is in the global dictionary; and
    encoding a dictionary index that identifies one of the plurality of common time derivatives.

4. The method of claim 1, further comprising:
    before determining the current position of the entity in the virtual simulation,
        determining position values of the entity in the virtual simulation; and
        quantizing the position values to be fixed-width integers.

5. The method of claim 1, wherein the time derivative of the current position of the entity is an acceleration of the current position of the entity.

6. The method of claim 4, further comprising:
    obtaining frequencies of each of a plurality of time derivatives of entity positions in the virtual simulation;
    selecting, based on the obtained frequencies, one or more most frequent current time derivatives for each previous time derivative; and
    storing the selected one or more most frequent current time derivatives.

7. A method comprising:
    determining, by a computing device, a current position of an entity in a virtual simulation;
    determining, based on the current position, a time derivative of the current position of the entity;
    obtaining frequencies of each of a plurality of time derivatives of entity positions in the virtual simulation;
    selecting, based on the obtained frequencies, one or more most frequent current time derivatives for each previous time derivative; and
    storing the selected one or more most frequent current time derivatives.

8. The method of claim 7, further comprising:
    determining that the one or more most frequent current time derivatives is in a global dictionary, wherein the global dictionary comprises a plurality of frequent current time derivatives for previous time derivatives of entities in the virtual simulation; and
    encoding a dictionary index that identifies one of the one or more most frequent current time derivatives.

9. A non-transitory computer-readable medium storing instructions that, when executed, cause:
    determining a current position of an entity in a virtual simulation;
    determining, based on the current position, a time derivative of the current position of the entity;
    querying a global dictionary for the time derivative of the current position of the entity, wherein the global dictionary comprises a plurality of common time derivatives associated with positions of a plurality of entities in the virtual simulation;
    based on a determination that the time derivative of the current position of the entity is not in the global dictionary, encoding the time derivative of the current position of the entity;
    determining an index identifying a time derivative value that corresponds to the time derivative of the current position of the entity;
    encoding the index; and
    sending the encoded index to a client device.

10. The non-transitory computer-readable medium of claim 9, wherein the instructions, when executed, further cause:
    querying a second dictionary for the time derivative of the current position of the entity, wherein the dictionary comprises one or more time derivative value pairs associated with time derivatives of one or more previous positions of the entity.

11. The non-transitory computer-readable medium of claim 8, wherein the instructions, when executed, further cause:
    determining that the time derivative of the current position of the entity is in a global dictionary; and
    encoding a dictionary index that identifies one of the plurality of common time derivatives.

12. The non-transitory computer-readable medium of claim 9, wherein the instructions, when executed, further cause:
    before determining the current position of the entity in the virtual simulation,
        determining position values of the entity in the virtual simulation; and
        quantizing the position values to be fixed-width integers.

13. The non-transitory computer-readable medium of claim 9, wherein the instructions, when executed, further cause:
obtaining frequencies of each of a plurality of time derivatives of entity positions in the virtual simulation;
selecting, based on the obtained frequencies, one or more most frequent current time derivatives for each previous time derivative; and
storing the selected one or more most frequent current time derivatives.

14. The non-transitory computer-readable medium of claim 9, wherein the time derivative of the current position of the entity is an acceleration of the current position of the entity.

15. A method comprising:
determining position values of an entity in a virtual simulation;
determining, based on the position values, a current position change of the entity in the virtual simulation;
determining, based on the current position change, a current acceleration of the current position change of the entity;
based on a determination that the current acceleration of the current position change of the entity is not in a global dictionary, encoding the current acceleration, wherein the global dictionary comprises a plurality of common accelerations associated with a plurality of entities in the virtual simulation;
determining an index identifying an acceleration value that corresponds to the current acceleration;
encoding the index; and
sending the encoded index to one or more client devices connected to the virtual simulation.

16. The method of claim 15, further comprising:
quantizing the position values to be fixed-width integers.

17. The method of claim 15, further comprising:
querying a second dictionary for the current acceleration, wherein the second dictionary comprises one or more acceleration value pairs associated with a previous acceleration of the entity.

18. The method of claim 15, further comprising:
based on a determination that the current acceleration is in a global dictionary, encoding a dictionary index that identifies one of the plurality of common accelerations.

19. The method of claim 15, wherein the encoding the index comprises entropy encoding the index.

20. The method of claim 15, further comprising:
obtaining frequencies of each of a plurality of acceleration values;
selecting, based on the obtained frequencies, one or more most frequent acceleration values for each previous acceleration value; and
storing the selected one or more most frequent acceleration values.

* * * * *